(12) United States Patent
Dold et al.

(10) Patent No.: US 12,434,944 B2
(45) Date of Patent: Oct. 7, 2025

(54) DETERMINATION OF THE STATE OF A SUSPENSION MEANS

(71) Applicant: Inventio AG, Hergiswil (CH)

(72) Inventors: Florian Dold, Cham (CH); Volker Zapf, Kriens-Obernau (CH)

(73) Assignee: INVENTIO AG, Hergiswil (CH)

( * ) Notice: Subject to any disclaimer, the term of this patent is extended or adjusted under 35 U.S.C. 154(b) by 1031 days.

(21) Appl. No.: 17/593,040

(22) PCT Filed: Mar. 16, 2020

(86) PCT No.: PCT/EP2020/057075
§ 371 (c)(1),
(2) Date: Sep. 7, 2021

(87) PCT Pub. No.: WO2020/200727
PCT Pub. Date: Oct. 8, 2020

(65) Prior Publication Data
US 2022/0185628 A1 Jun. 16, 2022

(30) Foreign Application Priority Data
Mar. 29, 2019 (EP) .................................... 19166107

(51) Int. Cl.
*B66B 7/12* (2006.01)
*B66B 3/00* (2006.01)

(52) U.S. Cl.
CPC ............ *B66B 7/1215* (2013.01); *B66B 3/002* (2013.01); *B66B 7/1238* (2013.01)

(58) Field of Classification Search
None
See application file for complete search history.

(56) References Cited

U.S. PATENT DOCUMENTS

| | | |
|---|---|---|
| 2003/0111298 A1 | 6/2003 | Logan et al. |
| 2017/0334677 A1 | 11/2017 | Dold |
| 2018/0229970 A1* | 8/2018 | Lehtinen ................ D07B 1/162 |

FOREIGN PATENT DOCUMENTS

| | | |
|---|---|---|
| EP | 3312126 A1 | 4/2018 |
| JP | 3759692 B2 | 3/2006 |
| WO | 2017195352 A1 | 11/2017 |

* cited by examiner

*Primary Examiner* — Michelle M Iacoletti
(74) *Attorney, Agent, or Firm* — Patrick B. Horne; Shumaker, Loop & Kendrick, LLP

(57) ABSTRACT

A method and an apparatus monitor the physical state of a suspension means that is connected to an elevator car and can move the same. The support means has markings along its length that divide the support means into segments. The strain difference of the suspension means is monitored segment by segment using a first strain at a first load and a second strain at a second load being determined by a signal processing unit from a distance between two selected markings detected by a detection device, and a strain difference representing the elastic behavior of the segment is calculated from the two strains, wherein the load acting on the suspension means between the two selected markings is measured by a load measuring device.

15 Claims, 4 Drawing Sheets

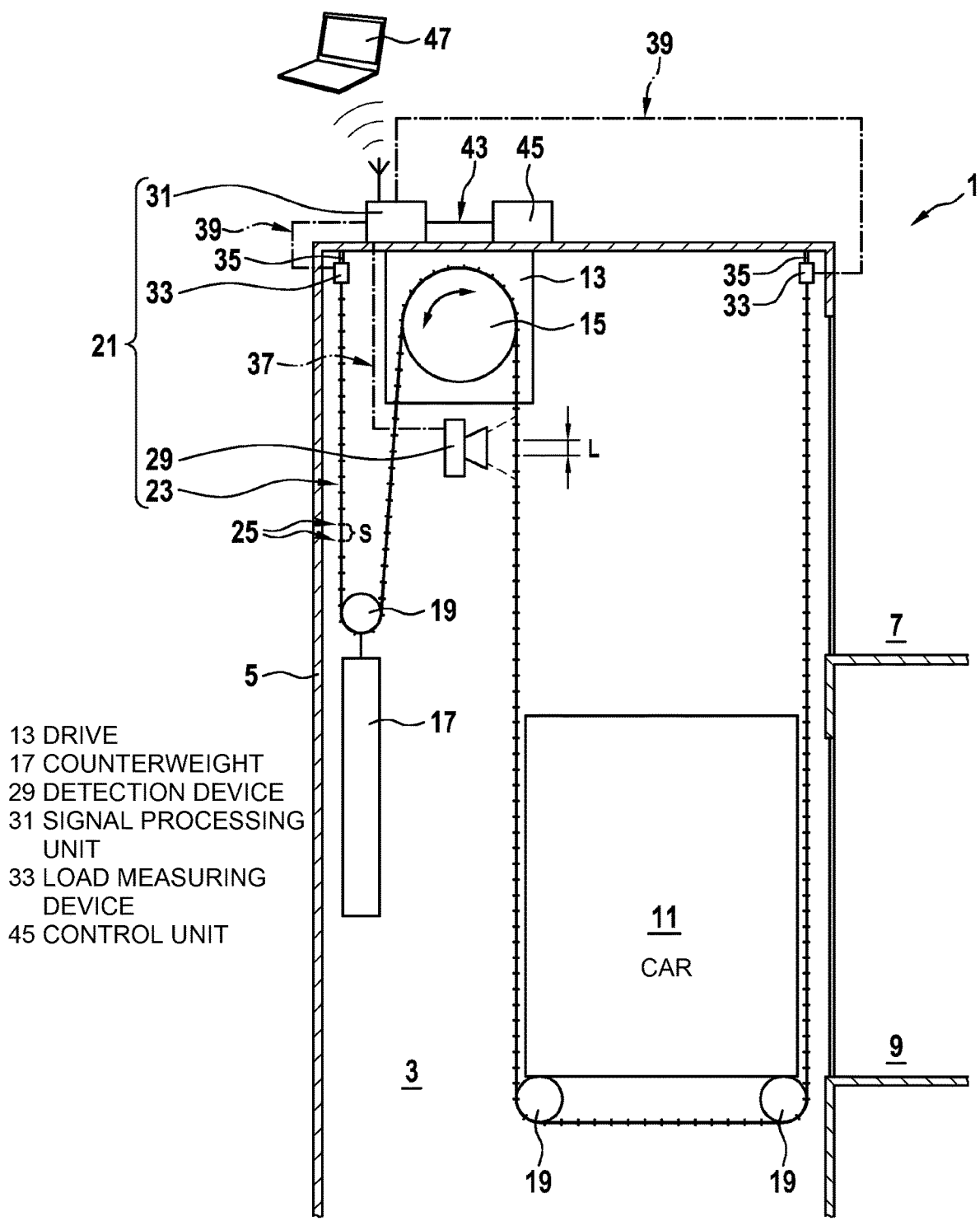

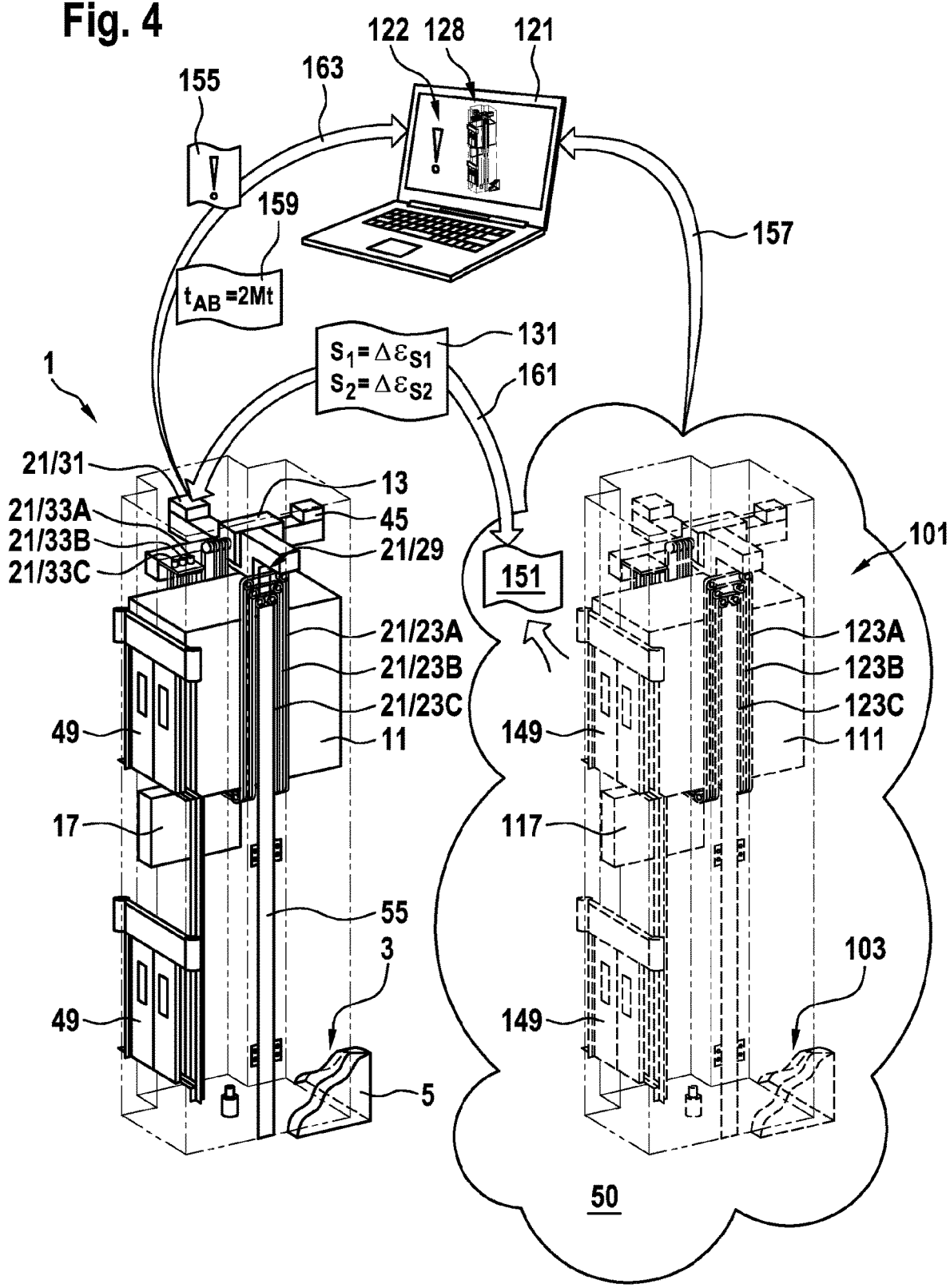

DETERMINATION OF THE STATE OF A SUSPENSION MEANS

FIELD

The invention relates to a method for monitoring the physical state of a suspension means, to an apparatus for carrying out the method and to an elevator system having this apparatus.

BACKGROUND

Elevators or elevator systems have an elevator car for accommodating passengers and/or objects, as well as a drive having a traction sheave and usually a suspension means. The suspension means is connected to the elevator car and guided over the traction sheave, so that the drive can move the elevator car. Depending on the design of the elevator system, the suspension means is also connected to a counterweight. Various suspension means guide variants are also possible. Depending on the suspension means guide variant, there are power transmission options, as are known, for example, from cables. In addition, an elevator system can also have a plurality of suspension means that are guided in parallel with one another.

The most critical component of an elevator system is the suspension means. It is critical because, on the one hand, it is passenger-bearing and, on the other hand, it is exposed due to its function to the highest loads such as high, pulsating tensile forces and bending changes. A suspension means of the type mentioned above can be a load-bearing tension member or a cable made from steel wire strands, aramid fibers or carbon fibers, which may have a plastics sheathing. However, it can also be an elevator belt, which is usually made of polyurethane and has load-bearing tension members in the interior thereof that are made of steel wire strands, aramid fiber bundles and/or carbon fiber bundles.

Due to the suspension means guidance via the traction sheave and possibly via deflection rollers, not every length portion of the suspension means is subjected to the same loads, and therefore the individual length portions show different signs of wear after a certain period of operation. In this case, the wear and tear that limits the service life is the decrease in the bearing cross-section as a result of wire or fiber breaks in the load-bearing tension members of the suspension means.

As a result of these signs of wear, the suspension means must be replaced periodically, with the most severely damaged length portion thereof logically being decisive. Up to now, the number of bending changes of the suspension means has usually been used as a measure of wear without taking the actual condition of the suspension means into account. This replacement is very expensive, which is why the operator is very interested in using the suspension means for as long as possible without risking the suspension means breaking during operation.

In order to meet this need, US2003/0111298A1 proposes monitoring the suspension means in the elevator system. For this purpose, the suspension means is divided into segments by markings. The markings can be detected by a detection device, such that a change in length of the individual segments can be measured. The changes in length of the individual segments are then compared with a limit value. As soon as one of the segments has reached the limit value, the suspension means must be replaced. By means of this monitoring, the point in time at which the suspension means is replaced, often also referred to as the point of discard, is no longer made dependent on the operating hours, but on the actual state of the elevator suspension means.

According to the description of US2003/0111298A1, the proposed method assumes that the change in length must always be determined at the same load, for example when traveling with the empty elevator car. Such empty journeys provided for measurement purposes limit the availability of the elevator system. In addition, the measured change in length also includes setting of the wire strands or fiber bundles, which has no influence on the carrying capacity of the suspension means. The proposed solution can lead to an early replacement of the suspension means due to the inherently harmless setting effects contained in the measurement result.

SUMMARY

An object of the present invention is therefore to determine the point of discard even more precisely from the state of the suspension means without restricting availability.

This object is achieved by a method for monitoring the physical state of a suspension means which is connected to an elevator car and can move same. The support means has markings along its length which can be detected by means of a detection device. The markings can be applied to the surface of the suspension means, for example by color printing or by thermal processes such as laser burn-in processes. The markings can in particular be designed as points, horizontal lines, matrix codes, bar codes and the like. However, the markings can also be of a different nature, such as, for example, RFID tags and the like arranged inside the suspension means. Accordingly, the detection device is matched to the marking used and can be a laser scanner, an RFID reader, a camera and the like.

So that setting effects have no influence on the determination of the state, according to the invention the strain difference of the suspension means is monitored segment by segment instead of the pure change in length or strain. The strain difference is detected in that a first strain at a first load and a second strain at a second load are determined by means of a signal processing unit from a distance between two selected markings detected by the detection device and a strain difference representing the elastic behavior of the segments is calculated from the two strains. In order to detect the loads acting during the strain measurements, a load measuring device is provided by means of which the load acting on the suspension means between the two selected markings can be measured.

The use of the strain difference as a criterion for determining the point of discard is based on the knowledge that in addition to the setting effects, an additional change in length occurs when individual wire strands or fibers are broken or subjected to wear and the bearing cross-section of the suspension means is reduced. This reduction leads to a changed elastic behavior of the suspension means segment, as it becomes more flexible or "softer." In other words, the strain difference of a segment which has broken wire strands or broken fibers changes or increases. It can be seen here that the most important criterion for determining the point of discard is used by means of the proposed method, namely the reduction in the bearing cross-section of the suspension means. Since the measurements for determining the strain difference can be carried out independently of a specified load by detecting the acting load the strain difference can be determined at any point in time and thus during normal operation.

The calculated strain difference can then be compared with a strain difference limit value. If the strain difference of a segment is equal to or greater than the strain difference limit value, the signal processing unit preferably sends an alarm signal to a control unit of the elevator system and/or to an output unit in order to, for example, stop the elevator system and/or indicate the necessary replacement of the suspension means.

Alternatively or additionally, a cross-sectional loss of the bearing cross-section can be calculated from the strain difference and compared with a limit value for the maximum permissible cross-sectional loss or a breaking load loss can be calculated from the strain difference and compared with a limit value for the maximum permissible breaking load loss.

If the calculated strain difference or the calculated cross-sectional loss or the calculated breaking load loss of a segment is below the limit value of the strain difference, cross-sectional loss, or breaking load loss, the signal processing unit can calculate the remaining service life of the suspension means in use, for example by extrapolating older, determined strain difference, cross-sectional loss, or breaking load loss values and the currently determined values. By means of this remaining service life, the replacement of the suspension means can be planned for both the operator and the maintenance company in terms of predictive maintenance planning.

In order to reduce the amount of data resulting from the measurements and calculations, the strain differences of the individual segments can be compared with one another and a hierarchy of the segments with regard to the strain difference thereof can be created. The segments can be selected analogously to this hierarchy, such that the strain difference of segments having an already increased strain difference is determined and compared with the strain difference limit value more frequently than that of segments having an unchanged strain difference. Furthermore, a random algorithm can be present according to which segments having previously unchanged or slightly changed strain differences are selected at random and the strain differences thereof are determined.

Since the markings are arranged on the suspension means, they can also be subjected to signs of wear. In order to continue to allow an undisturbed determination of the strain difference, a detectability criterion with regard to the detectability of the markings can be present. If a marking does not meet this detectability criterion and is therefore not readable or difficult to read, the next readable marking can be selected by the detection device or the signal processing unit.

In order to be able to assess the change in rigidity more precisely, it is advantageous if a standard value from the manufacturer is not used, but instead the suspension means actually used is analyzed in its new state. For this purpose, when the suspension means is put into operation, a strain difference in the new state of each segment can be measured and stored, by several strains of the segment at different loads being measured and stored as the force/strain curve depicting the strain difference in the new state. During operation, the strain difference of the individual segments can then be periodically compared with the respectively assigned strain difference of the force/strain curve when new.

The change in the strain difference of a segment can also be used to calculate the cross-sectional loss of the bearing cross-section of this segment and transmit the result to an output unit.

An apparatus is required to carry out the method, the apparatus having at least one suspension means divided into segments by means of markings, a load measuring device, a signal processing unit and a detection device for detecting the markings. The load measuring device can be designed very differently. For example, it can contain a load cell which is arranged in the suspension means. Preferably, however, the load cell is not arranged in the suspension means, but rather is part of a suspension means end attachment point at which one of the suspension means ends of the suspension means is attached to the car, to the counterweight or to part of a structure, this structure logically containing the elevator system having the suspension means to be monitored.

The signal processing unit is designed to monitor the strain difference of the suspension means segment by segment, by the signal processing unit determining a first strain at a first measured load, acting on the suspension means from the load measuring device, and a second strain at a second measured load, acting on the suspension means from the load measuring device, from a distance between two selected markings detected by the detection device and a strain difference representing the elastic behavior being calculated from the two strains. For this purpose, the signal processing unit has appropriate hardware with a processor and memory units as well as suitable software in which, among other things, the formulas listed in the description of the drawings are implemented.

Depending on the process sequences programmed in the software, the signal processing unit can select a segment and, accordingly, two markings according to predetermined criteria. This selection can be transmitted to the detection device, which then detects the distance between the two selected markings. An optical system is preferably used in this case and the length of the segments is selected such that at least two markings can be detected at the same time. To determine the strain of a segment, the detection time difference between the two selected markings and the speed or the speed profile of the suspension means relative to the detection device can also be recorded and calculated in order to determine the correct distance between the two markings or the strain of the segment.

In order to be able to clearly localize the most serious points of wear, each marking advantageously has an identification which can be clearly distinguished from the other markings.

In order to facilitate the detection, the two selected markings are preferably arranged one after the other on the suspension means and delimit the segment of which the strain difference is to be calculated.

However, it is also possible for further markings arranged on the suspension means to be present between the two selected markings that delimit the segment. If these two selected markings can no longer be detected simultaneously by the detection device, the length of the segment, as mentioned above, must be calculated from the detection time and the speed.

The apparatus described above can be a fixed, permanent component of an elevator system. However, it is also conceivable that the above-mentioned apparatus is only temporarily installed in an elevator system in order to be able to more precisely estimate the emerging end of the service life and to be able to better plan the upcoming replacement. Of course, an existing system can also be retrofitted with the apparatus described.

Particularly precise monitoring can be achieved if the elevator system comprises an updated digital twin data record, which contains the physical components of the elevator system in digital form as interconnected and interacting component model data records with characterizing properties. In this case, the signal processing unit is configured to exchange data with the updated digital twin data record.

The data transmitted from the signal processing unit to the updated digital twin data record can include the strain differences of segments which, as characterizing properties, can be transferred to assigned virtual segments of a suspension means of the updated digital twin data record depicted as a digital component model data record. Here, the corresponding, previous characterizing properties or strain difference values of the virtual segments are replaced and the updated digital twin data record is updated as a result.

Using the updated digital twin data record, static and dynamic simulations can be carried out to determine the point of discard or the remaining service life. The updated digital twin data record provides an excellent virtual simulation environment because it contains and depicts all relevant characterizing properties of the physical components of the elevator system. Additional loads, for example, such as suspension means vibrations due to the changed rigidities can therefore be simulated and the effects thereof on the other components examined, such that, for example, the increased strain difference of the segment or the correspondingly reduced bearing cross-section does not immediately determine the point of discard, but rather the changing vibration behavior of the suspension means and the effects thereof, for example, on driving comfort and other components of the elevator system such as the guide rails, the guide shoes of the elevator car and the like. The simulation results obtained in this way can then be evaluated in the signal processing unit by appropriately programmed logic; if necessary, an alarm signal can be generated by the signal processing unit and transmitted to a control unit of the elevator system and/or an output unit. The output unit can have various designs. For example, it can have display means such as loudspeakers or screens. Furthermore, the simulation results can be processed with further data from the updated digital twin data record and displayed as a three-dimensional virtual representation on a screen. Such a representation can also be dynamic, i.e. in the virtual representation of the elevator system, as in the physical elevator system, three-dimensionally represented component model data records can be moved and behave dynamically according to their physical equivalents.

DESCRIPTION OF THE DRAWINGS

Embodiments of the invention will be described in the following with reference to the accompanying drawings, with neither the drawings nor the description being intended to be interpreted as limiting the invention. In the drawings:

FIG. 1 schematically shows an elevator system having an apparatus according to the invention, which has a suspension means divided into segments by means of markings, a detection device for detecting the markings and a load measuring device;

FIG. 4 is a three-dimensional, more detailed view of the elevator system of FIG. 1 with an apparatus according to the invention and an updated digital twin data record (UDTDR) depicting the physical passenger transport system, which data record is stored in a data cloud and with which the signal processing unit can exchange data.

DETAILED DESCRIPTION

Figure 2A:
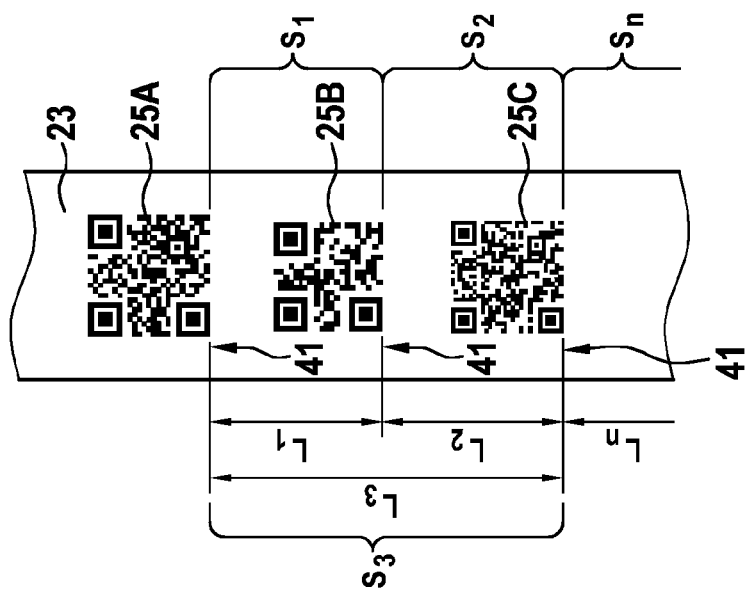
FIGS. 2A to 2C show, in a possible embodiment, a section of a suspension means divided into segments by means of markings, with the figures showing different stages of the same section.

FIG. 1 schematically shows an elevator system 1 which is arranged in an elevator shaft 3 of a structure 5. The elevator system 1 connects a plurality of floors 7, 9 of the structure 5 in the vertical direction and is used to transport passengers and/or objects.

The elevator system 1 has an elevator car 11, a drive 13 having a traction sheave 15, and a counterweight 17. Furthermore, an apparatus 21 according to the invention is arranged in the elevator system 1, which apparatus comprises a suspension means 23 divided into segments S by means of markings 25, a detection device 29, a signal processing unit 31 and a load measuring device 33.

Wire cables, aramid cables, carbon fiber cables or belts having tension members are used as suspension means 23, depending on the type of elevator system. As tension members, steel strands, aramid fiber bundles or carbon fiber bundles can be enclosed in a polyurethane sheathing and arranged inside the belt.

The markings 25 shown in FIG. 1 are arranged along the length of the suspension means 23 and shown as small projections. So as not to impair the driving comfort, the markings 25 are preferably not protruding, but instead are applied to the surface of the suspension means 23, for example by color printing or by thermal processes such as laser burn-in processes. Openings or depressions arranged transversely to the longitudinal extension in the support means 23 could also serve as markings. The markings 25 can be designed as points, horizontal lines, matrix codes, bar codes and the like. However, the markings 25 can also be of a different nature, such as, for example, RFID tags and the like arranged inside the suspension means.

The detection device 29 is matched to the markings 25 used and can be a laser scanner, an RFID reader, a camera and the like, so that the markings 25 can be easily detected. As shown in FIG. 1, several markings 25 can be detected simultaneously by the detection device 29. This has the decisive advantage that at least the distance between two adjacently arranged markings 25 and thus the segment length L of the segment S defined by the detectable markings 25 can be determined directly from the representation captured by the detection device 29 and the speed of the suspension means 23 passing the detection device 29 does not need to be detected in order to calculate the segment length L of the segment S between the two markings 25 by means of the speed and the detection time.

The suspension means guide variant shown in FIG. 1 shows a suspension means 23, the two ends of which are connected to the structure 5 via suspension means end connections 35 and which is guided over the traction sheave 15 and over deflection rollers 19 of the counterweight 17 and the elevator car 11. From this it can be clearly seen which bending-change loads the suspension means 23 is subjected to during the operation of the elevator system 1. In addition, the suspension means 23 is loaded with high tensile forces by the elevator car 11 and the counterweight 17. Since the elevator car 11 and the counterweight 17 are accelerated and braked again in both vertical directions, the tensile force is also superimposed by a pulsating tensile force. The tensile force or load acting on the suspension means 23 can be measured by means of the load measuring device 33, which in the present embodiment is arranged on both suspension means end connections 35.

The load measuring device 33 and the detection device 29 are connected to the signal processing unit 31 via the signal lines 37, 39 shown by a dash-dotted line.

As will be explained in detail below with reference to FIGS. 2A to 2C and FIG. 3, the state of the suspension means 23 can be monitored by an elevator system 1 which has a corresponding apparatus 21. The values calculated for the strain difference, the cross-sectional loss or the breaking load loss can then be compared with a corresponding limit value. If these calculated values of a segment S are equal to or greater than the corresponding limit value, the signal processing unit 31 can send an alarm signal to a control unit 45 of the elevator system 1 and/or in a wired or wireless manner to an output unit 47 via a signal line 43 in order to trigger further actions, such as stopping the elevator system 1 and/or indicating the necessary replacement of the suspension means 23.

Figure 2B:
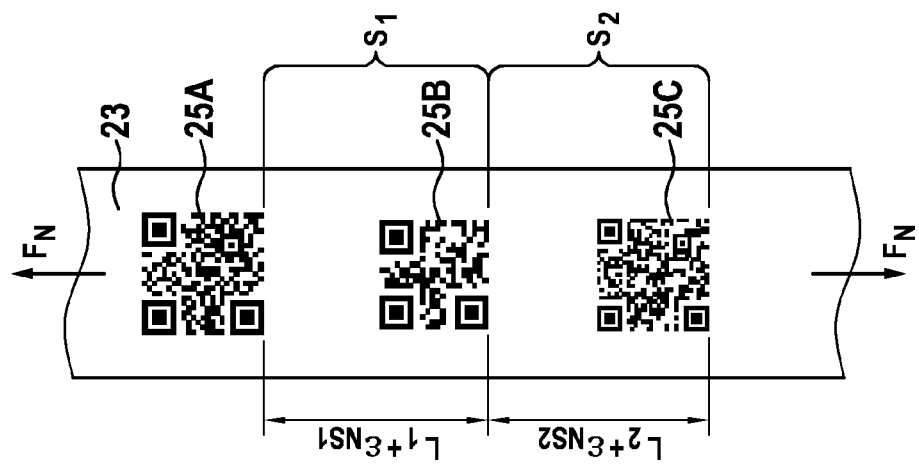
Figure 2C:
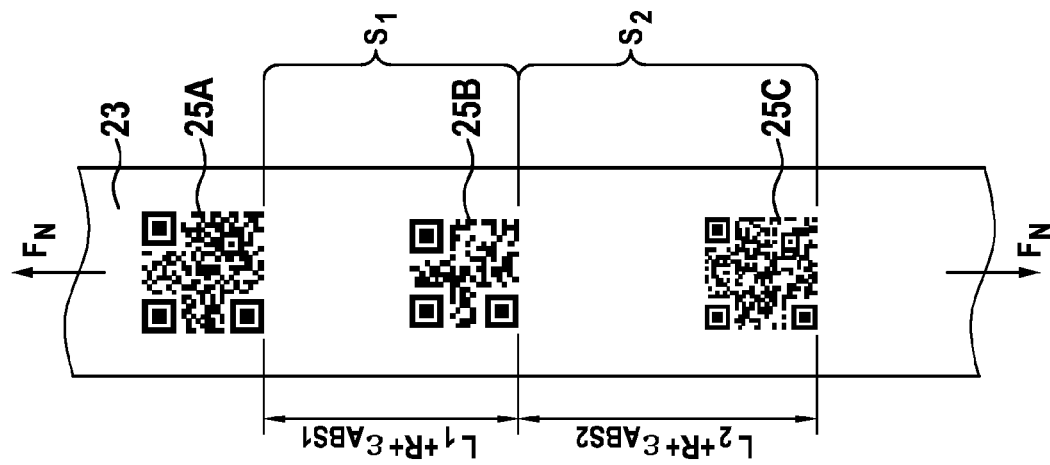

FIGS. 2A to 2C show, in a possible embodiment, the same section of a suspension means 23 divided into segments $S_1$, $S_2$, $S_n$ by means of markings 25A, 25B, 25C in different stages. Each of the markings 25A, 25B, 25C is a matrix code printed on the material of the suspension means 23, which has a clear, distinguishable identification, which is why the reference signs of the markings 25A, 25B, 25C shown have been added alphanumerically.

As indicated in FIG. 2A, the markings 25A, 25B, 25C delimit the segments $S_1$, $S_2$, $S_n$, the segment boundaries 41 being defined by the lower edges of the markings 25A, 25B, 25C in the present embodiment. Of course, the center, the upper edge, a specific centering point of each marking 25A, 25B, 25C or other clearly identifiable properties of the marking 25A, 25B, 25C could be used to define the segment boundary 41.

In order to facilitate the detection, the two markings 25A, 25B, 25C selected for defining a segment $S_1$, $S_2$, $S_n$ are preferably arranged one after the other on the suspension means 23 and delimit the segment $S_1$, $S_2$, $S_n$ of which the strain difference $\Delta\varepsilon$ (see FIG. 3) is to be calculated. In the present example, these are segment $S_1$ with segment length $L_1$ and segment $S_2$ with segment length $L_2$.

Logically, not only are the two segments $S_1$, $S_2$ with the segment lengths $L_1$, $L_2$ thereof present, but rather the entire suspension means 23 is preferably divided into segments $S_n$ having a comparable segment length $L_n$, as indicated in FIG. 1 (S, L).

However, it is also possible that a marking 25A, 25B, 25C can no longer be detected by the detection device 29 due to signs of wear on the surface of the suspension means. In this case, the illegible marking 25A, 25B, 25C can be skipped and the next marking 25A, 25B, 25C selected. In the present example, the middle of the three shown markings 25B is illegible for the detection device 29, and therefore it is skipped and another marking 25B arranged on the suspension means 23 is present between the two selected markings 25A, 25C which delimit the segment S. As a result, this newly defined segment $S_3$ has the segment length $L_3$. If these two selected markings 25A, 25C can no longer be detected simultaneously by the detection device 29, the segment length $L_3$ of the segment $S_3$, as mentioned above, must be calculated from the detection time of the two markings 25A, 25C and the speed of the suspension means 23.

In order to be able to better illustrate various influences on the suspension means 23, FIG. 2A shows a section of the suspension means 23 in a brand-new, unloaded state, so that the segments $S_1$, $S_2$ have the segment lengths $L_1$, $L_2$ created by the printing of the markings 25A, 25B, 25C.

FIG. 2B shows the same section as FIG. 2A, also in the new state, but for example under the load $F_N$, which corresponds, for example, to the maximum permissible load or the maximum permissible loading of the elevator car 11. In this case, the suspension means 23 is expanded, such that the segment $S_1$ has the segment length $L_1+\varepsilon_{NS1}$ and the segment $S_2$ has the segment length $L_2+\varepsilon_{NS2}$.

FIG. 2C shows the same section as FIG. 2B under the same load $F_N$, but after long use of the suspension means 23 when it has reached the end of its service life or is at the point of discard. As can be clearly seen in comparison with FIG. 2B, the segment length $L_1+R+\varepsilon_{ABS1}$ of the first segment $S_1$ has increased at least by the setting effects R for the same load $F_N$. The setting effects R of the segment $S_1$ alone do not lead to the point of discard, as they are substantially caused by the irreversible alignment of the tension members under load and/or by irreversible or permanent extensions as a result of rolling effects on the deflection rollers and the bearing cross-section of the suspension means 23 is not significantly reduced thereby.

As the indices reveal, the length portion of the strain at the point of discard $\varepsilon_{ABS1}$ can differ from the length portion of the strain in the new state $\varepsilon_{NS1}$. However, this can only be determined if the pure length portion of the setting effects R were known. However, this cannot be determined in isolation from the strain.

The segment $S_2$ also has setting effects R, so that it has the segment length $L_2+R+\varepsilon_{ABS2}$. Since the two segments, as shown in FIG. 2A, originally had approximately the same segment lengths $L_1$, $L_2$ and, as shown in FIG. 2B, each segment $S_1$, $S_2$ also has a comparable strain $\varepsilon_{NS1}$, $\varepsilon_{NS2}$ and thus a comparable strain difference $\Delta\varepsilon$, the segment lengths $L_1$, $L_2$ in FIG. 2C would also have to be approximately the same length. However, this is not the case, since segment $S_2$ is significantly longer than segment $S_1$. This difference is due to a reduction in the strain difference $\Delta\varepsilon$ in this segment $S_2$. This change correlates directly with a reduction in the bearing cross-section of the suspension means 23, since segment $S_2$ becomes "softer" as a result of this reduction and can be expanded more at the same load $F_N$. By determining the strain difference $\Delta\varepsilon$ according to the invention during the operation of the elevator installation 1 for each segment $S_1$, $S_2$, $S_n$, the above-mentioned problem with regard to the setting effects R can be avoided.

With regard to the reference symbols $L_1$, $L_2$, R, $\varepsilon_{NS1}$, $\varepsilon_{NS2}$, it should be noted that these would have different units according to their usual meaning. The addition selected in FIGS. 2A to 2B is only intended to indicate the proportions of the change in length based on various causes.

Figure 3:
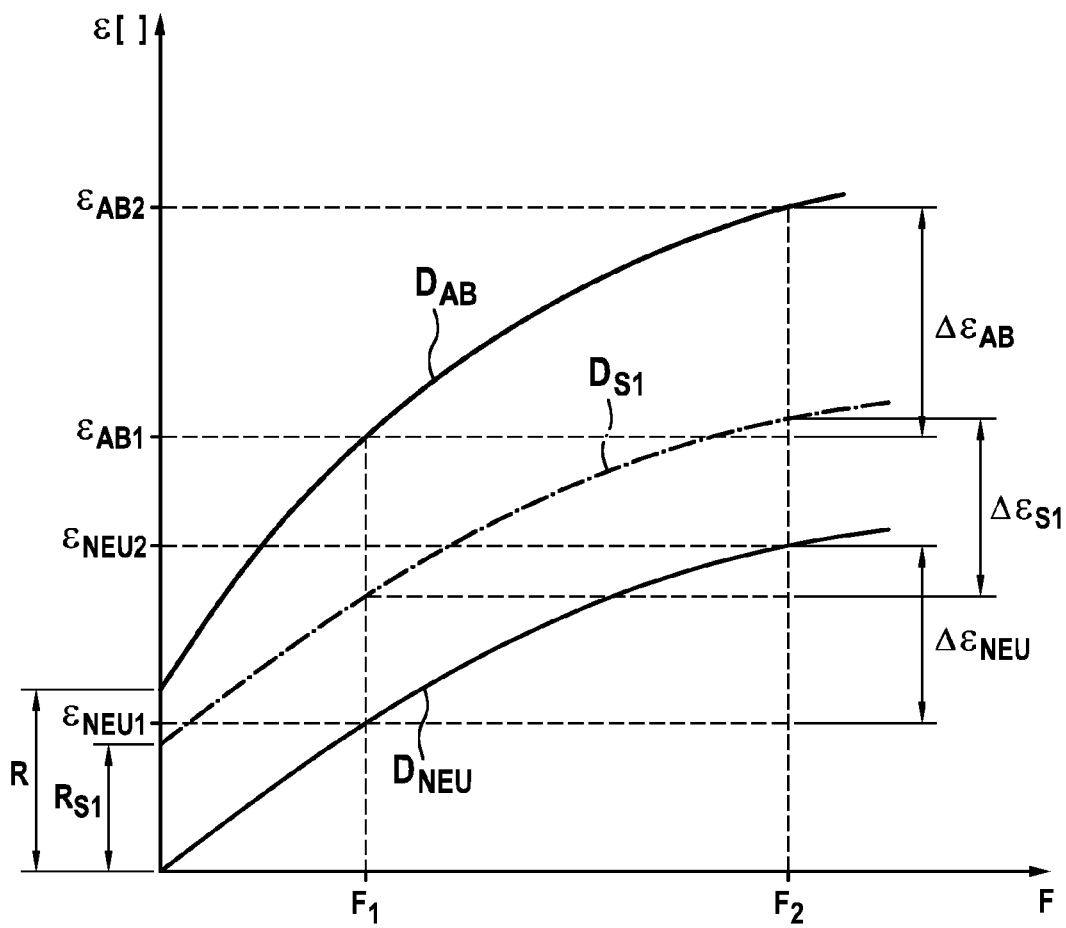
FIG. 3 is a diagram with the force-strain curves on which the invention is based, the first curve representing the strain difference of a segment in the new state and the second curve representing the strain difference of the same segment when the point of discard is reached.

FIG. 3 is a diagram with the force-strain curves $D_{NEU}$, $D_{AB}$ and $D_{S1}$ on which the invention is based. The first force-strain curve $D_{NEU}$ represents the strain difference $\Delta\varepsilon_{NEU}$ of a segment $S_1$, $S_2$, $S_n$ in the new state and the second force-strain curve $D_{AB}$ represents the strain difference $\Delta\varepsilon_{AB}$ of a segment $S_1$, $S_2$, $S_n$ when the point of discard is reached. The ordinate of the diagram shows the strain $\varepsilon$ of a segment $S_1$, $S_2$, $S_n$ given as a percentage of the original segment length $L_1$, $L_2$, $L_n$ and the abscissa shows the load F acting in segment $S_1$, $S_2$, $S_n$ or on the suspension means 23.

It is clear from the diagram shown that the setting effects R have no influence on the monitoring of the state of the suspension means 23. The setting effects R are a pure offset between the two force-strain curves $D_{NEU}$, $D_{AB}$. According to the invention, instead of the pure strain ε, the strain difference Δε of the suspension means 23 is monitored in segments. The strain difference Δε is detected in that a first strain $ε_1$ at a first load $F_1$ and a second strain $ε_2$ at a second load $F_2$ are determined by means of the signal processing unit 31 shown in FIG. 1 from a distance or the segment length $L_1$, $L_2$, $L_n$ between two selected markings 25 detected by the detection device 29 and a strain difference Δε representing the elastic behavior is calculated from the two strains $ε_1$, $ε_2$ according to the following general formula:

Strain difference $Δε = ε_2 - ε_1$

The following applies to the "new state" and "point of discard" cases shown in the diagram:

Strain difference in the new state: $Δε_{NEU} = ε_{NEU2} - ε_{NEU1}$

Strain difference at point of discard: $Δε_{AB} = ε_{AB2} - ε_{AB1}$ where the symbols are:
$ε_{NEU1}$=strain, new state at load $F_1$
$ε_{NEU2}$=strain, new state at load $F_2$
$ε_{AB1}$=strain, point of discard at load $F_1$
$ε_{AB2}$=strain, point of discard at load $F_2$ With the determined strain differences $Δε_{NEU}$, $Δε_{AB}$, the cross-sectional loss ΔA of the bearing cross-section of the suspension means 23 in the corresponding segment $S_1$, $S_2$, $S_n$ can also be calculated:

$$\text{Cross-sectional loss } ΔA = \frac{F_2 - F_1}{E * Δε_{NEU}} - \frac{F_2 - F_1}{E * Δε_{AB}}$$

where the symbols are:
$F_1$=first load
$F_2$=second load, which is greater than the first load $F_1$
E=modulus of elasticity of the bearing cross-section
$Δε_{NEU}$=strain difference in new state
$Δε_{AB}$=strain difference at point of discard The breaking load loss in this segment $S_1$, $S_2$, $S_n$ can also be calculated:

$$\text{Breaking load loss } ΔF_{Bruch} = \frac{A_{NEU} - ΔA}{A_{NEU}} * F_{Bruch\ NEU}$$

where the symbols are:
$F_{Bruch\ NEU}$=breaking load of the suspension means in the new state
$A_{NEU}$=cross-sectional area of the bearing cross-section of the suspension means in the new state
ΔA=loss of cross-section From the preceding explanations it can be seen that the cross-sectional loss ΔA or breaking load loss $ΔF_{Bruch}$ can be compared with defined limit values for the maximum permissible cross-sectional loss $ΔA_{Grenz}$ or the maximum permissible breaking load loss $ΔF_{Bruch\ Grenz}$. When these limit values are reached, the point of discard is also reached.

In FIG. 3, the example of a force-strain curve $D_{S1}$ is shown by a dash-dotted line, which shows the strain difference $Δε_{S1}$ of the segment $S_1$ after several hours of operation. The setting effects $R_{S1}$, which have not yet progressed so far, can also be seen for this specific segment $S_1$. As the parallel course of the force-strain curve $D_{S1}$ of the already loaded segment $S_1$ to the force-strain curve in the new state $D_{NEU}$ clearly shows, the strain difference $Δε_{S1}$ of the segment $S_1$ does not differ, despite the operating hours, from the strain difference in the new state $Δε_{NEU}$ and the suspension means 23 has not yet reached the point of discard with regard to this segment $S_1$. Even if the setting effects $R_{S1}$ of the segment $S_1$ were the same as the setting effects R, due to the lack of a difference in the strain differences $Δε_{S1}$, $Δε_{NEU}$ the point of discard of the suspension means 23 in relation to this segment $S_1$ would not yet have been reached.

The use of the strain difference Δε as a criterion for determining the point of discard is based on the knowledge that in addition to the setting effects R, an additional change in length occurs when individual wire strands or fibers of the bearing cross-section of a suspension means 23 are broken and the bearing cross-section of the suspension means 23 is thereby reduced. This reduction leads to a changed elastic behavior of the segment $S_1$, $S_2$, $S_n$, which has been weakened by fractures and wear, as it becomes more flexible or "softer." In other words, the strain difference Δε of a segment $S_1$, $S_2$, $S_n$ which has broken wire strands or broken fibers changes or increases. It can be seen here that the most important criterion for determining the point of discard is used by means of the proposed method, namely the reduction in the bearing cross-section of the suspension means 23. Since the measurements for determining the strain difference Δε can be carried out independently of a specified load $F_1$, $F_2$ by detecting the acting load $F_1$, $F_2$, the strain difference Δε can be determined at any point in time and thus during normal operation of the elevator system 1. The two loads $F_1$, $F_2$ should logically be different and the measurements should preferably take place with the elevator car 11 traveling in the same direction. The load measuring device 33 shown in FIG. 1 is provided in order to detect the loads $F_1$, $F_2$ acting between the two selected markings 25 during the strain measurements on the suspension means 23.

If the calculated strain difference Δε of a segment $S_1$, $S_2$, $S_n$ is below the strain difference limit value $Δε_{Grenz}$, the signal processing unit 31 can calculate the remaining service life of the suspension means 23 in use, for example by extrapolating older, determined strain difference values Δε and the most recent strain difference values Δε. By means of this remaining service life, the replacement of the suspension means 23 can be planned for both the operator and the maintenance company in terms of predictive maintenance planning.

In order to be able to assess the change in the strain difference Δε more precisely, it is advantageous if a standard value from the manufacturer is not used, but instead the suspension means 23 actually used is analyzed in its new state. For this purpose, when the suspension means 23 is put into operation, a strain difference in the new state $Δε_{NEU}$ of each segment $S_1$, $S_2$, $S_n$ can be measured and stored, by several strains of the segment $S_1$, $S_2$, $S_n$ at different loads $F_1$, $F_2$ being measured and stored as the force/strain curve representing the strain difference in the new state $Δε_{NEU}$. During operation, the strain difference of the individual segments $S_1$, $S_2$, $S_n$ can be periodically compared with the respectively assigned strain difference in the new state $Δε_{NEU}$.

FIG. 4 shows the elevator system 1 of FIG. 1 with an apparatus 21 according to the invention in more detail in a three-dimensional view. In contrast to FIG. 1, which is shown very schematically, there are clearly three parallel suspension means 23A, 23B, 23C in the elevator system 1 of FIG. 4, which suspension means belong to the apparatus 21. Due to different setting effects, dynamic load differences, friction and the like, not all three suspension means 23A, 23B, 23C are equally loaded, i.e. are subjected to the same load. In order to take this into account and to determine the strain differences $\Delta\varepsilon$ of the segments $S_1$, $S_2$, $S_n$ (see FIGS. 2A to 2C) of each individual suspension means 23A, 23B, 23C as precisely as possible, one load measuring device 33A, 33B, 33C is assigned to each of the three suspension means 23A, 23B, 23C, which load measuring devices also belong to the apparatus 21. The detection device 29 provided for the apparatus 21 can detect the markings (not shown) of all three suspension means 23A, 23B, 23C.

Particularly precise monitoring of the state of the suspension means can be achieved if the elevator system 1 comprises an updated digital twin data record 101, which contains the physical components of the elevator system 1 in digital form as interconnected and interacting component model data records with characterizing properties. In this case, the signal processing unit 31 of the apparatus 21 is configured, as shown by the double arrow 161, to exchange data 131 with the updated digital twin data record 101. The updated digital twin data record 101 depicting the elevator installation 1 is referred to as UDTDR 101 for the sake of better readability.

The UDTDR 101 is a virtual image that is as comprehensive as possible and tracks the current physical state of the elevator system 1 and therefore represents a virtual elevator system assigned to the elevator system 1. This means that the UDTDR 101 is not only a virtual shell model of the elevator system 1 which roughly represents the dimensions thereof, but it also includes and depicts every single physical component from the elevator car 11, the shaft doors 49, the counterweight 17 to the last screw, with all the possible characterizing properties of these components, in digitized form in the UDTDR 101 as a component model data record of the elevator car 111, as a component model data record of the shaft doors 149, as a component model data record of the counterweight 117, etc. Likewise, interfaces of the elevator system 1, such as, for example, the elevator shaft 3 belonging to the building 5, can be depicted as a component model data record 103 in the UDTDR 101.

The characterizing properties of their physical counterparts of the elevator system 1 contained in the component model data records 111, 149, 117 can be geometric dimensions of the components such as a length, a width, a height, a cross-section, radii, fillets, etc. The surface quality of the components, for example roughnesses, textures, coatings, colors, reflectivities, etc., is also part of the characterizing properties. Furthermore, material values such as the modulus of elasticity, bending change strength, hardness, notched impact strength, tensile strength, etc., can also be stored as characterizing properties of each component. These are not theoretical properties (target data) such as those found on a production drawing, but rather characterizing properties actually determined on the physical component (actual data). Assembly-relevant specifications, such as the actually applied tightening torque of a screw and thus the pretensioning force thereof, are preferably also assigned to the relevant component.

Whenever strain differences $\Delta\varepsilon_{S1}$, $\Delta\varepsilon_{S2}$, $\Delta\varepsilon_{Sn}$ of the individual segments $S_1$, $S_2$, $S_n$ are determined, these can be transmitted from the signal processing unit 31 to the UDTDR 101. The newly determined strain differences $\Delta\varepsilon_{S1}$, $\Delta\varepsilon_{S2}$, $\Delta\varepsilon_{Sn}$ of the individual suspension means 23A, 23B, 23C replace the previously existing strain differences $\Delta\varepsilon_{S1}$, $\Delta\varepsilon_{S2}$, $\Delta\varepsilon_{Sn}$ of the component model data records, which are also divided into segments $S_1$, $S_2$, $S_n$, of the suspension means 123A, 123B, 123C in order to continuously update the UDTDR 101.

In other words, the data 131 transmitted from the signal processing unit 31 to the UDTDR 101 include the strain differences $\Delta\varepsilon_{S1}$, $\Delta\varepsilon_{S2}$, $\Delta\varepsilon_{Sn}$ of segments $S_1$, $S_2$, $S_n$ which, as characterizing properties, are transferred to assigned virtual segments $S_1$, $S_2$, $S_n$ of a suspension means 123A, 123B, 123C of the UDTDR 101 depicted as a digital component model data record. Logically, the measured lengths $L_1$, $L_2$, $L_n$ of the segments $S_1$, $S_2$, $S_n$ can also be transmitted, such that the component model data records of the suspension means 123A, 123B, 123C also have the effective lengths of their physical counterparts.

The UDTDR 101 is not bound to a specific storage location or processing location. It can, for example, be stored in the signal processing unit 31 of the apparatus, but also in the control unit 45, in a computer 121 or in a network having a plurality of computer systems. In particular, as shown, the UDTDR 101 can be implemented in a computer network which stores and processes data in the form of a data cloud 50. For this purpose, the computer network can have a memory or, as shown symbolically, storage resources 151 in the data cloud 50, in which the data of the UDTDR 101 (symbolically depicted in broken lines as a three-dimensional image of the physical passenger transport system 1) can be stored, for example, in electronic or magnetic form. This means that the UDTDR 101 can be stored in any storage location.

Using the UDTDR 101, static and dynamic simulations can be carried out to determine the point of discard or remaining service life $t_{AB}$. The UDTDR 101 provides an excellent virtual simulation platform as it contains and depicts all relevant characterizing properties of the physical components. The simulations can be carried out, for example, in the data cloud 50, but also by temporarily storing and processing the UDTDR 101 in the signal processing unit 31. Additional loads such as suspension means vibrations due to the changed strain differences $\Delta\varepsilon_{S1}$, $\Delta\varepsilon_{S2}$, $\Delta\varepsilon_{Sn}$ and/or due to the changed length of the suspension means 23A, 23B, 23C can be simulated and the effects thereof on the other components examined, such that, for example, the increased strain difference $\Delta\varepsilon_{S1}$, $\Delta\varepsilon_{S2}$, $\Delta\varepsilon_{Sn}$ of the segment $S_1$, $S_2$, $S_n$ or the correspondingly reduced bearing cross-section does not immediately determine the point of discard, but rather the changing vibration behavior of the suspension means 23A, 23B, 23C and the effects thereof, for example, on driving comfort and the components of the elevator system 1 such as the guide rails 55, the guide shoes of the elevator car 11 and the like. By means of simulated interpolation using previously determined strain differences $\Delta\varepsilon_{S1}$, $\Delta\varepsilon_{S2}$, $\Delta\varepsilon_{Sn}$, which have been stored chronologically, the remaining time until the point of discard, also referred to as the remaining service life $t_{AB}$, can be calculated.

The simulation results 159 obtained in this way can then be transmitted to an output unit, in the present example the screen 122 of a portable computer 121, as shown by the arrow 163. Furthermore, alarm signals 155 can also be generated and transmitted to the output unit 122, in particular, of course, when the calculations and/or simulations have shown that the suspension means 23A, 23B, 23C has reached its point of discard. The output unit does not necessarily have to be a screen 122, but can, for example, also be a loudspeaker and the like. The alarm signal 155 can, for example, also be forwarded to the control unit 45 of the physical elevator system 1 and the like and processed there, triggering corresponding actions.

Furthermore, as symbolically represented by the arrow 157, the simulation results can be processed with further data from the UDTDR 101 and displayed as a three-dimensional virtual representation 128 on the screen 122. Such a virtual representation 128 can also be dynamic, i.e. in the virtual representation 128 of the elevator system, as in the physical elevator system 1, all three-dimensionally represented component model data records 111, 117, 149 provided with degrees of freedom can be moved by the data of the UDTDR 101 and behave dynamically according to their physical equivalents.

Although FIGS. 1 through 4 relate to different aspects of the present invention and these have been described in detail using the example of an elevator system 1 having a 2:1 suspension means guide variant, it is obvious that the described method steps and a corresponding apparatus may be used in the same way for elevator systems 1 having other suspension means guide variants such as 1:1, 3:1, etc. In addition, the signal processing unit 31 is shown in FIGS. 1 and 4 as a self-contained unit consisting of hardware and software. However, the signal processing unit 31 can also be implemented separately from the physical elevator system 1, for example on the portable computer 121 or in the data cloud 50.

Finally, it should be noted that terms such as "comprising," "having," etc. do not preclude other elements or steps and terms such as "a" or "an" do not preclude a plurality. Furthermore, it should be noted that features or steps that have been described with reference to one of the above embodiments may also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

The invention claimed is:

1. A method for monitoring a physical state of a suspension means for moving an elevator car, the suspension means being connected to and suspending the elevator car, the suspension means being divided into segments by markings along a length of the suspension means, the method comprising the steps of:
    detecting the markings with a detection device;
    monitoring a strain difference of the suspension means segment by segment by determining using a signal processing unit a first strain at a first load acting on the suspension means and a second strain at a second load acting on the suspension means from a distance between two selected ones of the detected markings, wherein the first load and the second load acting on the suspension means between the two selected markings are measured by a load measuring device;
    calculating the strain difference representing an elastic behavior of a one of the segments that is between the two selected markings from the first strain and the second strain;
    performing the monitoring and the calculating for additional ones of the segments; and
    generating an alarm signal when any one of the calculated strain differences indicates that the suspension means is at a point of discard.

2. The method according to claim 1 including determining when the suspension means is at the point of discard by at least one of:
    comparing each of the calculated strain differences with a predetermined strain difference limit value;
    calculating a cross-sectional loss in each of the segments from the calculated strain difference of the segment and comparing the cross-sectional losses with a predetermined limit value for a maximum permissible cross-sectional loss; and
    calculating a breaking load loss from each of the calculated strain differences and comparing the breaking load losses with a predetermined limit value for a maximum permissible breaking load loss.

3. The method according to claim 2 including calculating the strain difference for a plurality of the segments, comparing the calculated strain differences with one another, creating a hierarchy of the segments with regard to the calculated strain differences, selecting ones of the segments according to the hierarchy such that the strain differences of ones of the segments having an increased calculated strain difference are calculated more frequently than the strain differences of ones of the segments having an unchanged calculated strain difference.

4. The method according to claim 1 including providing a detectability criterion with regard to a detectability of the markings by the detection device as being not readable or difficult to read, and when a one of the markings does not meet the detectability criterion selecting a next one of the markings along the length of the suspension means that meets the detectability criterion.

5. The method according to claim 1 wherein when the suspension means is first put into operation, measuring and storing a strain difference in a new state of each of the segments, and during subsequent operation of the suspension means periodically comparing the calculated strain difference of individual ones of the segments with a respective one of the strain differences in the new state.

6. An apparatus for performing the method according to claim 1, the apparatus comprising:
    the suspension means divided into the segments by the markings;
    the load measuring device for measuring the first load and the second loads acting on the suspension means;
    the signal processing unit for monitoring the strain differences by determining the first strain and the second strain and calculating the strain differences; and
    the detection device for detecting the markings.

7. The apparatus according to claim 6 wherein the signal processing unit selects one of the segments and the two makings corresponding to the selected segment according to a predetermined criteria, and the signal processing unit transmits the selection of the one segment to the detection device to detect the corresponding two markings.

8. The apparatus according to claim 6 wherein each of the markings has a unique identification that is distinguishable by the detection device from the identifications of all others of the markings.

9. The apparatus according to claim 6 wherein each of the segments is delimited by a corresponding two of the markings arranged successively along the length of the suspension means.

10. The apparatus according to claim 6 wherein at least one of the segments is delimited by two of the markings and wherein at least another of the markings is arranged between the two markings.

11. An elevator system comprising:
    the apparatus according to claim 6; and
    an elevator car connected to and suspended by the suspension means.

12. The elevator system according to claim 11 including an updated digital twin data record containing physical components of the elevator installation in digital form as component model data records having characterizing properties, and wherein the signal processing unit exchanges data with the updated digital twin data record.

13. The elevator system according to claim 12 wherein the data being exchanged includes data transmitted by the signal processing unit to the updated digital twin data record being the calculated strain differences of the segments which, as the characterizing properties, are transferred to assigned virtual segments of a suspension means of the updated digital twin data record depicted as a digital component model data record and replace corresponding previous characterizing properties of the segments.

14. The elevator system according to claim 13 wherein the updated digital twin data record is adapted to carry out static and dynamic simulations for determining the point of discard or remaining service life of the suspension means, and the simulation results are transmitted to at least one of a control unit of the elevator system and an output unit of the elevator system.

15. A method for monitoring a physical state of a suspension means for moving an elevator car in an elevator system, the suspension means being connected to and suspending the elevator car, the suspension means being divided into segments by markings along a length of the suspension means, the method comprising the steps of:
selecting one of segments;
determining by a signal processing unit a first strain at a first load acting on the suspension means and a second strain at a second load acting on the suspension means from a distance between two of the markings detected by the detection device that delimit the selected one segment, wherein the first load and the second load acting on the suspension means between the two markings are measured by a load measuring device;
calculating a strain difference representing an elastic behavior of the selected one segment between the two markings from the first strain and the second strain;
generating an alarm signal when the calculated strain difference indicates that the suspension means is at a point of discard and transmitting the alarm signal to at least one of a control unit of the elevator system and an output unit of the elevator system; and
performing the method steps for at least another of the segments of the suspension means.

* * * * *